United States Patent [19]
Sawaya

[11] 3,880,582
[45] Apr. 29, 1975

[54] ANIONIC DYEABLE POLYESTER

[75] Inventor: Albert R. Sawaya, Akron, Ohio

[73] Assignee: The Goodyear Tire & Rubber Company, Akron, Ohio

[22] Filed: Aug. 27, 1969

[21] Appl. No.: 853,544

[52] U.S. Cl. .......................... 8/115.5; 8/171; 8/179
[51] Int. Cl. .................. D06m 5/10; D06m 11/18; D06m 13/54; D06p 3/52; D06p 5/04
[58] Field of Search ............ 8/115.5, 171, 172, 168, 8/100, 179; 117/47 A; 260/75 T, 75 P, 75 N

[56] References Cited
UNITED STATES PATENTS

| | | | |
|---|---|---|---|
| 2,901,311 | 8/1959 | Nusslein | 8/62 |
| 3,082,053 | 3/1963 | Goodings | 8/100 |
| 3,145,073 | 8/1964 | Gagliardi | 8/100 |
| 3,252,749 | 5/1966 | Mautner | 8/55 |
| 3,314,743 | 4/1967 | Gagliardi | 8/171 X |
| 3,460,896 | 8/1969 | Caldwell | 8/115.5 |
| 3,480,378 | 11/1969 | Taube | 8/39 |

FOREIGN PATENTS OR APPLICATIONS

| | | | |
|---|---|---|---|
| 620,001 | 5/1961 | Canada | 8/171 |

Primary Examiner—Norman G. Torchin
Assistant Examiner—John R. Miller
Attorney, Agent, or Firm—F. W. Brunner; J. M. Wallace, Jr.

[57]        ABSTRACT

Polyethylene terephthalate and terephthalate copolyesters in fabrics are treated with phosphoric acid followed by an alkyl polyamine such as ethylene diamine to render the fabrics more dyeable with acid dyestuffs.

18 Claims, No Drawings

ANIONIC DYEABLE POLYESTER

This invention relates to fibers and fabrics of polyalkylene terephthalates and copolyesters containing the terephthalate group such as copolyesters of a dihydric alcohol, terephthalic acid and dimer acid (see U.S. Pat. No. 3,390,108), copolyesters of ethylene terephthalate and ethylene isophthalate and other copolyesters hereinafter mentioned. More particularly the invention relates to introducing anionic dyeability to polyesters and copolyesters by treating the polymers with phosphoric acid followed by treatment with ethylene diamine or other alkyl polyamines.

The polyesters useful in accordance with the present invention are cold drawing, linear, highly polymerized esters of terephthalic acid and glycols of the formula $HO(CH_2)_nOH$, where $n$ is an integer of from 2 to 10. The copolyesters used in this invention may comprise ethylene terephthalate-ethylene isophthalate copolyesters as described in U.S. Pat. No. 2,965,613 to Milone et al.

In producing polyalkylene terephthalates there is involved the interaction of at least two molecular proportions of a glycol (preferably ethylene glycol) per molecular proportion of terephthalic acid with the splitting out of water. Subsequent heating of the resulting glycol ester of terephthalic acid at about 250° to 260° C. under 0.05 to 20 millimeters of mercury pressure absolute results in the production of high polymer with the splitting out of glycol which is removed from the reaction mixture.

Alternatively, highly polymeric polyalkylene terephthalates may be produced by heating terephthalic acid bodies, such as ester forming derivatives of terephthalic acid with at least one glycol. Suitable ester forming derivatives are aliphatic or aromatic esters of terephthalic acid such as $C_1$ to $C_4$ alkyl esters and/or aryl esters such as those from phenol, cresols and the like. The preferred derivatives are methyl and ethyl terephthalates.

In this latter alternative procedure first there is a transesterification reaction (or ester interchange reaction) to low polymer with the evolution of alcohol. Subsequently, upon heating at about 250° to 260° C. under 0.05 to 20 millimeters of mercury absolute pressure there is a polycondensation reaction to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

The preparation of ethylene terephthalate-ethylene isophthalate copolyesters is along lines previously described and is described in detail in U.S. Pat. No. 2,965,613 (supra).

Other linear aromatic polyester resins useful for the purposes of the invention include, among others, not only polyethylene terephthalate and copolyesters of ethylene terephthalate and ethylene isophthalate, but also such polyesters as those of cyclohexane dimethylol terephthalate, polyethylene-2,6-naphthalate and copolyesters of terephthalic acid which contain at least 75 mol percent of terephthalic acid.

In accordance with the invention, anionic dyeable polyesters and copolyesters are produced by immersing fibers, filaments or fabrics of the polymers in concentrated phosphoric acid at 0° to 150° C. or higher for about 0.05 to 30 minutes, preferably for about 0.2 to 5.0 minutes. The treated material (polymer) is then exposed in a circulating air oven for 50 to 200 minutes at 120° F. up to 0.05 to 40 minutes at 350° F.

The polymer is then rinsed with water until neutral and immersed in a $C_2$ to $C_{20}$ alkylene polyamine such as a diamine (e.g. ethylene diamine) solution at 5° C. to the boiling point of the amine for 0.5 to 10.0 minutes, preferably for 0.5 to 5.0 minutes, followed by rinsing until neutral. Fibers, filaments and fabrics of polymers treated by this method pick up deep shades of anionic dyes when dyed by conventional methods for applying acid dyestuffs.

Although the invention has been described as treatment of polymers with ethylene diamine after phosphoric acid, other alkyl polyamines may be employed in place of part or all of the ethylene diamine. Typical alkyl polyamines within the scope of the invention include, among others, pentamethylene diamine, tetramethylene diamine, hexamethylene diamine, triethylene tetramine, and mixtures thereof.

Typical anionic (acid) dyestuffs suitable for the purpose of the invention include, among others, Brilliant Alizarine Sky Blue (Acid Blue 129), Supranol Red PBX (Acid Red 114), Amacid Yellow S Conc (Acid Yellow 1), Kiton Orange II (Acid Orange 7), Erio Fast Rubine 3GP (Acid Red 57), Acid Anthracene Red 3B (Acid Red 89), Kiton Pure Blue L (Acid Blue 9), Alizarine Light Blue 4GL (Acid Blue 23), Erio Green B conc (Acid Green 16), Amacid Light Yellow 3G Conc (Acid Yellow 11), Fast Silk Yellow GL (Acid Yellow 40), Acid Orange R.Ex (Acid Orange 8), Cibalan Yellow 2GL Extra (Acid Yellow 129), and Mauve (Acid Red 17).

In order to more fully describe the present invention the following experimental data are given.

EXAMPLE

Knit fabirc of polyethylene terephthalate/dimer acid copolyester (97.5/2.5) prepared as described in U.S. Pat. No. 3,390,108 to Keck et al, was immersed in 85 percent phosphoric acid (25° C.) for one minute, then exposed at 120° F. (for 5 to 20 minutes) to 350° F. (for 0.5 to 40 minutes) (e.g. at 220° F. for 20 minutes) in a circulating air oven. The fabric was then rinsed with water until neutral pH. It was then immersed in 98 percent ethylene diamine solution at 5° C. to below the boiling point of the amine (e.g. 25° C.) for about 0.05 to 10.0 minutes, preferably 0.5 to 5.0 minutes (e.g. 1 minute), then rinsed with water until neutral.

The resulting fabric was dyed in 0.1 to 5.0 percent (e.g. 1 percent) Alizarine Sky Blue B S (anionic dye) at a pH of 3.0 for 10 minutes to 50 hours, preferably 20 minutes to 10 hours (e.g. 1 hour) at the boil. Medium to deep shades were obtained.

Resort may be had to modifications and variations of the disclosed embodiments without departing from the spirit of the invention or the scope of the appended claims.

What I claim is:

1. An improved anionic dyeable polyester which has been reacted with concentrated phosphoric acid followed by reaction with an alkylene polyamine.

2. An improved anionic dyeable polyester which has been reacted first with phosphoric acid and then with ethylene diamine.

3. The polyester of claim 1 in which the polymer is a copolyester.

4. The polyester of claim 1 in which the polymer is a copolyester of ethylene terephthalate and ethylene isophthalate.

5. The polyester of claim 1 in which the polymer is a copolyester derived from at least one glycol, terephthalic acid and a dimer acid.

6. In a process for dyeing polyesters, the improvement which comprises immersing said polyester in concentrated phosphoric acid at a temperature of about 0° to 150°C. for about 0.05 to 30 minutes followed by immersing in an alkylene polyamine and finally immersing the polyester in a dye.

7. A process in accordance with claim 6 in which the polyester is a copolyester.

8. A process in accordance with claim 6 in which the polyester is immersed in ethylene diamine as the alkylene polyamine.

9. A process in accordance with claim 6 in which the polyester is a copolyester of ethylene terephthalate and ethylene isophthalate.

10. A process in accordance with claim 6 in which the polyester is a copolyester derived from at least one glycol, terephthalic acid and a dimer acid.

11. The polyester of claim 1 in the form of a fiber.

12. The polyester of claim 1 in the form of a fabric.

13. The process of claim 6 in which the polyester is in the form of a fiber.

14. The process of claim 6 in which the polyester is in the form of a fabric.

15. The anionic dyeable polyester of claim 1 in which the alkylene polyamine is selected from the group consisting of ethylene diamine, pentamethylene diamine, tetramethylene diamine, hexamethylene diamine, triethylene tetramine, and mixtures thereof.

16. The process of claim 6 in which the alkylene polyamine is selected from the group consisting of ethylene diamine, pentamethylene diamine, tetramethylene diamine, hexamethylene diamine, triethylene tetramine, and mixtures thereof.

17. The anionic dyeable polyester of claim 1 in which the polyester is poly(1,4-cyclohexane dimethylene) terephthalate.

18. The process of claim 6 in which the polyester is poly(1,4-cyclohexane dimethylene) terephthalate.

* * * * *